United States Patent
Zhang et al.

(10) Patent No.: US 11,964,774 B2
(45) Date of Patent: Apr. 23, 2024

(54) UNMANNED AERIAL VEHICLE SAFETY PROTECTION METHOD AND APPARATUS AND UNMANNED AERIAL VEHICLE

(71) Applicant: AUTEL ROBOTICS CO., LTD., Guangdong (CN)

(72) Inventors: Tianbao Zhang, Guangdong (CN); Yingjie Li, Guangdong (CN); Gang Chen, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 173 days.

(21) Appl. No.: 17/577,608

(22) Filed: Jan. 18, 2022

(65) Prior Publication Data
US 2022/0153431 A1 May 19, 2022

Related U.S. Application Data (63) Continuation of application No. PCT/CN2020/103045, filed on Jul. 20, 2020.

(30) Foreign Application Priority Data

Jul. 18, 2019 (CN) .......................... 201910650531.8

(51) Int. Cl.
*B64D 45/04* (2006.01)
*B64C 39/02* (2023.01)
(Continued)

(52) U.S. Cl.
CPC ............ *B64D 45/04* (2013.01); *B64C 39/024* (2013.01); *G05D 1/106* (2019.05);
(Continued)

(58) Field of Classification Search
CPC .. B64D 45/04; B64D 2045/008; G05D 1/106; G05D 1/0676; G05D 1/101;
(Continued)

(56) References Cited

U.S. PATENT DOCUMENTS

| 4,979,154 A | 12/1990 | Brodeur |
| 2008/0243316 A1* | 10/2008 | Sacle ...................... G01C 5/06 |
| | | 701/9 |

(Continued)

FOREIGN PATENT DOCUMENTS

| CN | 106444825 A | 2/2017 |
| CN | 106989719 A | 7/2017 |

(Continued)

OTHER PUBLICATIONS

Machine translation of description of CN 106989719 A, pp. 1-6 (Year: 2023).*

(Continued)

*Primary Examiner* — Anne Marie Antonucci
*Assistant Examiner* — Jared C Bean (57) ABSTRACT

The present invention relates to the field of unmanned aerial vehicle safety protection technologies, and in particular, to an unmanned aerial vehicle safety protection method and apparatus and an unmanned aerial vehicle. The method includes: obtaining ultrasonic information and a flight status of an unmanned aerial vehicle, where the flight status includes a normal flight state and a descending state; and performing safety protection on the unmanned aerial vehicle according to the ultrasonic information and the flight status. The implementation can reduce an occurrence probability that an unmanned aerial vehicle crashes at a high altitude when ultrasound encounters abnormalities to get out of control at the high altitude and fail to descend, rise, move to the left or move to the right and land without slowing down to violently hit the ground, so that the safety of the unmanned aerial vehicle is enhanced, and user experience is improved.

13 Claims, 4 Drawing Sheets

(51) Int. Cl.
  *B64D 45/00* (2006.01)
  *B64U 10/13* (2023.01)
  *B64U 70/00* (2023.01)
  *G05D 1/00* (2006.01)
  *G05D 1/10* (2006.01)
  *G08G 5/00* (2006.01)

(52) U.S. Cl.
  CPC ........ *B64D 2045/008* (2013.01); *B64U 10/13* (2023.01); *B64U 70/00* (2023.01); *B64U 2201/10* (2023.01); *G08G 5/0069* (2013.01)

(58) Field of Classification Search
  CPC .. B64C 39/024; B64U 2201/10; B64U 10/13; B64U 70/00; B64U 10/10; G08G 5/0069
  See application file for complete search history.

(56) References Cited

U.S. PATENT DOCUMENTS

2017/0336805 A1* 11/2017 Luo .................. B64F 1/007
2021/0209954 A1* 7/2021 Tazume ................. B64D 45/04

FOREIGN PATENT DOCUMENTS

| CN | 107438567 A | 12/2017 |
| CN | 107943090 A | 4/2018 |
| CN | 110262559 A | 9/2019 |

OTHER PUBLICATIONS

PCT International Search Report dated Sep. 29, 2020; PCT/CN2020/103045.

* cited by examiner

UNMANNED AERIAL VEHICLE SAFETY PROTECTION METHOD AND APPARATUS AND UNMANNED AERIAL VEHICLE

CROSS-REFERENCE TO RELATED APPLICATIONS

The present application is a continuation of International Application No. PCT/CN2020/103045, filed on Jul. 20, 2020, which claims priority to Chinese patent application No. 201910650531.8, filed on Jul. 18, 2019, which is incorporated herein by reference in its entirety.

TECHNICAL FIELD

The present application relates to the field of unmanned aerial vehicle safety protection technologies, and in particular, to an unmanned aerial vehicle safety protection method and apparatus and an unmanned aerial vehicle.

BACKGROUND

An above-ground height is critical information during takeoff and landing of an unmanned aerial vehicle. An inaccurate above-ground height affects the takeoff and landing performance of the unmanned aerial vehicle, especially the landing performance. Currently, ultrasound is adopted to measure the above-ground height, and a down-looking ultrasonic radar is often adopted to sense the ground to implement safe takeoff and landing of the unmanned aerial vehicle and normal flight of the unmanned aerial vehicle.

However, ultrasound is prone to interference and becomes unstable, mainly exhibiting that ultrasound data undergoes intermittent interruptions or is inaccurately measured, ultrasound data occasionally suffers from deceptive values of constants, ultrasound may be completely damaged after an unmanned aerial vehicle ages or crashes repeatedly, ultrasound data experiences severe delays and the like. The unmanned aerial vehicle may crash at a high altitude due to the abnormalities of ultrasound to get out of control at the high altitude and fail to descend, rise, move to the left or move to the right and land without slowing down to violently hit the ground, seriously affecting the performance and user experience of the unmanned aerial vehicle.

SUMMARY

Technical problems to be resolved by the present invention is to provide an unmanned aerial vehicle safety protection method, and resolve the technical problems that an unmanned aerial vehicle crashes at a high altitude to get out of control at the high altitude and fail to descend, rise, move to the left or move to the right and land without slowing down to violently hit the ground.

An aspect of the embodiments of the present invention provides an unmanned aerial vehicle safety protection method, the method including:

obtaining ultrasonic information and a flight status of an unmanned aerial vehicle, where the flight status includes a normal flight state and a descending state; and performing safety protection on the unmanned aerial vehicle according to the ultrasonic information and the flight status.

Optionally, when the flight status is the normal flight state, the performing safety protection on the unmanned aerial vehicle according to the ultrasonic information and the flight status includes:

determining whether the ultrasonic information is valid;

if the ultrasonic information is valid, detecting whether an ultrasonically measured height is less than a first preset value;

if the ultrasonically measured height is less than the first preset value, limiting a descending speed of the unmanned aerial vehicle not to be greater than a first speed threshold.

Optionally, when the flight status is the normal flight state, the performing safety protection on the unmanned aerial vehicle according to the ultrasonic information and the flight status includes:

when the ultrasonically measured height is greater than or equal to the first preset value, controlling the unmanned aerial vehicle to fly normally.

Optionally, when the flight status is the normal flight state, the performing safety protection on the unmanned aerial vehicle according to the ultrasonic information and the flight status further includes:

if the ultrasonic information is invalid, detecting whether a fused height is less than the first preset value; and if the fused height is less than the first preset value, limiting the descending speed of the unmanned aerial vehicle not to be greater than the first speed threshold.

Optionally, when the flight status is the normal flight state, the performing safety protection on the unmanned aerial vehicle according to the ultrasonic information and the flight status further includes:

when the fused height is greater than or equal to the first preset value, controlling the unmanned aerial vehicle to fly normally.

Optionally, when the flight status is the descending state, the performing safety protection on the unmanned aerial vehicle according to the ultrasonic information and the flight status includes:

determining whether the ultrasonic information is valid;

if the ultrasonic information is invalid, determining whether the fused height is in a preset interval; and if the fused height is in the preset interval, limiting a descending speed of the unmanned aerial vehicle not to be greater than a second speed threshold, and setting a first propeller stopping threshold as a propeller stopping threshold of the unmanned aerial vehicle.

Optionally, when the flight status is the descending state, the performing safety protection on the unmanned aerial vehicle according to the ultrasonic information and the flight status further includes:

determining, according to an acceleration of the unmanned aerial vehicle, whether the unmanned aerial vehicle has landed;

if the unmanned aerial vehicle has landed, controlling the unmanned aerial vehicle to perform propeller stopping; and if the unmanned aerial vehicle has not landed, limiting the descending speed of the unmanned aerial vehicle not to be greater than the second speed threshold, and setting the first propeller stopping threshold as the propeller stopping threshold of the unmanned aerial vehicle.

Optionally, the determining whether the unmanned aerial vehicle has landed includes:

obtaining a Z-axis acceleration Az and a specific thrust T of the unmanned aerial vehicle;

calculating a value of A according to a formula $A = -Az - T$; and determining whether the value of A is greater than the first propeller stopping threshold, where if the value of A is greater than the first propeller stopping threshold, the unmanned aerial vehicle has landed, or if the value of A is not greater than the first propeller stopping threshold, the unmanned aerial vehicle has not landed.

Optionally, when the flight status is the descending state, the performing safety protection on the unmanned aerial vehicle according to the ultrasonic information and the flight status includes:

if the fused height is not in the preset interval, controlling the unmanned aerial vehicle to continue descending.

Optionally, when the flight status is the descending state, the performing safety protection on the unmanned aerial vehicle according to the ultrasonic information and the flight status further includes:

when the ultrasonic information is valid, detecting whether an above-ground height of the unmanned aerial vehicle is less than a second preset value; and if the above-ground height of the unmanned aerial vehicle is less than the second preset value, limiting the descending speed of the unmanned aerial vehicle not to be greater than a third speed threshold, and setting a second propeller stopping threshold as the propeller stopping threshold of the unmanned aerial vehicle.

Optionally, when the flight status is the descending state, the performing safety protection on the unmanned aerial vehicle according to the ultrasonic information and the flight status further includes:

determining, according to an acceleration of the unmanned aerial vehicle, whether the unmanned aerial vehicle has landed;

if the unmanned aerial vehicle has landed, controlling the unmanned aerial vehicle to perform propeller stopping; and if the unmanned aerial vehicle has not landed, limiting the descending speed of the unmanned aerial vehicle not to be greater than a third speed threshold, and setting a second propeller stopping threshold as the propeller stopping threshold of the unmanned aerial vehicle.

Optionally, the determining whether the unmanned aerial vehicle has landed includes:

obtaining a Z-axis acceleration Az and a specific thrust T of the unmanned aerial vehicle;

calculating a value of A according to a formula $A=-Az-T$; and determining whether the value of A is greater than the second propeller stopping threshold, where if the value of A is greater than the second propeller stopping threshold, the unmanned aerial vehicle has landed, and if the value of A is not greater than the second propeller stopping threshold, the unmanned aerial vehicle has not landed.

Optionally, when the flight status is the descending state, the performing safety protection on the unmanned aerial vehicle according to the ultrasonic information and the flight status further includes:

when it is detected that the above-ground height of the unmanned aerial vehicle is greater than or equal to the second preset value, controlling the unmanned aerial vehicle to continue descending.

Optionally, the determining whether the ultrasonic information is valid includes:

obtaining a fused height of the unmanned aerial vehicle;

obtaining, according to the fused height and the ultrasonic information, an ultrasonic credibility detection result, and obtaining an ultrasonic update detection result according to the ultrasonic information; and when the ultrasonic credibility detection result and the ultrasonic update detection result both meet preset values, determining that the ultrasonic information is valid, or otherwise determining that the ultrasonic information is invalid.

Another aspect of the embodiments of the present invention provides an unmanned aerial vehicle safety protection apparatus, the apparatus including:

an information obtaining module, configured to obtain ultrasonic information and a flight status of an unmanned aerial vehicle, where the flight status includes a normal flight state and a descending state; and a safety protection module, configured to perform safety protection on the unmanned aerial vehicle according to the ultrasonic information and the flight status.

Optionally, when the flight status is the normal flight state, the safety protection module is configured to:

determine whether the ultrasonic information is valid;

if the ultrasonic information is valid, detect whether an ultrasonically measured height is less than a first preset value; and if the ultrasonically measured height is less than the first preset value, limit a descending speed of the unmanned aerial vehicle not to be greater than a first speed threshold.

Optionally, when the flight status is the normal flight state, the safety protection module is configured to:

when the ultrasonically measured height is greater than or equal to the first preset value, control the unmanned aerial vehicle to fly normally.

Optionally, when the flight status is the normal flight state, the safety protection module is further configured to:

if the ultrasonic information is invalid, detect whether a fused height is less than the first preset value; and if the fused height is less than the first preset value, limit the descending speed of the unmanned aerial vehicle not to be greater than the first speed threshold.

Optionally, when the flight status is the normal flight state, the safety protection module is further configured to:

when the fused height is greater than or equal to the first preset value, control the unmanned aerial vehicle to fly normally.

Optionally, when the flight status is the descending state, the safety protection module is further configured to:

determine whether the ultrasonic information is valid;

if the ultrasonic information is invalid, determine whether the fused height is in a preset interval; and if the fused height is in the preset interval, limit a descending speed of the unmanned aerial vehicle not to be greater than a second speed threshold, and set a first propeller stopping threshold as a propeller stopping threshold of the unmanned aerial vehicle.

Optionally, when the flight status is the descending state, the safety protection module is further configured to:

determine, according to an acceleration of the unmanned aerial vehicle, whether the unmanned aerial vehicle has landed;

if the unmanned aerial vehicle has landed, control the unmanned aerial vehicle to perform propeller stopping; and if the unmanned aerial vehicle has not landed, limit the descending speed of the unmanned aerial vehicle not to be greater than the second speed threshold, and set the first propeller stopping threshold as the propeller stopping threshold of the unmanned aerial vehicle.

Optionally, when the flight status is the descending state, the safety protection module is further configured to:

if the fused height is not in the preset interval, control the unmanned aerial vehicle to continue descending.

Optionally, when the flight status is the descending state, the safety protection module is further configured to:

when the ultrasonic information is valid, detect whether an above-ground height of the unmanned aerial vehicle is less than a second preset value; and if the above-ground height of the unmanned aerial vehicle is less than the second preset value, limit the descending speed of the unmanned aerial vehicle not to be greater than a third speed threshold, and set a second propeller stopping threshold as the propeller stopping threshold of the unmanned aerial vehicle.

Optionally, when the flight status is the descending state, the safety protection module is further configured to:

determine, according to an acceleration of the unmanned aerial vehicle, whether the unmanned aerial vehicle has landed;

if the unmanned aerial vehicle has landed, control the unmanned aerial vehicle to perform propeller stopping; and if the unmanned aerial vehicle has not landed, limit the descending speed of the unmanned aerial vehicle not to be greater than a third speed threshold, and set a second propeller stopping threshold as the propeller stopping threshold of the unmanned aerial vehicle.

Optionally, when the flight status is the descending state, the safety protection module is further configured to:

when it is detected that the above-ground height of the unmanned aerial vehicle is greater than or equal to the second preset value, control the unmanned aerial vehicle to continue descending.

Further another aspect of the embodiments of the present invention provides an unmanned aerial vehicle, including: a vehicle body; a vehicle arm, connected to the vehicle body; a power apparatus, arranged on the vehicle arm, and configured to supply power for the unmanned aerial vehicle to fly; and a flight controller, arranged on the vehicle body, where the flight controller includes: at least one processor; and a memory, communicatively connected to the at least one processor, the memory storing instructions executed by the at least one processor, the instructions being executed by the at least one processor to cause the at least one processor to perform the foregoing method.

Still further another aspect of the embodiments of the present invention provides a non-volatile computer-readable storage medium, the non-volatile computer-readable storage medium storing computer-executable instructions, the computer-executable instructions being used for causing a computer to perform the foregoing method.

In the embodiments of the present invention, ultrasonic information and a flight status of an unmanned aerial vehicle are obtained to perform safety protection on the unmanned aerial vehicle according to the ultrasonic information and the flight status. The ultrasonic information may be data information acquired through normal ultrasound or may be data information acquired by abnormal ultrasound. The flight status includes takeoff, landing and normal flight of the unmanned aerial vehicle. When the safety protection is performed on the unmanned aerial vehicle according to the ultrasonic information and the flight status, a corresponding safety protection method may be adopted according to different ultrasonic information and different flight statuses. The implementation can reduce an occurrence probability that an unmanned aerial vehicle crashes at a high altitude when ultrasound encounters abnormalities to get out of control at the high altitude and fail to descend, rise, move to the left or move to the right and land without slowing down to violently hit the ground, so that the safety of the unmanned aerial vehicle is enhanced, and user experience is improved.

BRIEF DESCRIPTION OF THE DRAWINGS

One or more embodiments are described by way of example with reference to the corresponding figures in the accompanying drawings, and the descriptions are not to be construed as limiting the embodiments. Elements in the accompanying drawings that have same reference numerals are represented as similar elements, and unless otherwise particularly stated, the figures in the accompanying drawings are not drawn to scale.

DETAILED DESCRIPTION

To make the objectives, technical solutions, and advantages of the present invention clearer and more comprehensible, the following further describes the present invention in detail with reference to the accompanying drawings and embodiments. It should be understood that the embodiments herein are provided for describing the present invention and not intended to limit the present invention.

It should be noted that, the features in the embodiments of the present invention may be combined with each other in the case of no conflict, which all fall within the protection scope of the present invention. In addition, although the functional modules are divided in the schematic diagram of the apparatus, and a logical order is shown in the flowchart, in some cases, the step shown or described may be performed in a different module division or logical order from the module division in the schematic diagram of the apparatus, or the order shown in the flowchart.

An unmanned aerial vehicle safety protection method and apparatus provided by the embodiments of the present invention may be applied to various different types of unmanned aerial vehicles. An unmanned aerial vehicle usually senses the ground through a down-looking ultrasonic radar. During takeoff, landing and normal flight of the unmanned aerial vehicle, the unmanned aerial vehicle detects the altitude of the unmanned aerial vehicle from the ground through the ultrasonic radar mounted on the unmanned aerial vehicle. If the ultrasonic radar encounters a problem, the takeoff, landing and normal flight of the unmanned aerial vehicle are affected. Therefore, the core of the embodiments of the present invention is to implement different safety protection on the unmanned aerial vehicle according to an ultrasound status including normal ultrasound and abnormal ultrasound of the unmanned aerial vehicle and a current specific flight status of the unmanned aerial vehicle, thereby improving the safety of the unmanned aerial vehicle and the flexibility of performing safety protection on the unmanned aerial vehicle.

Figure 1:
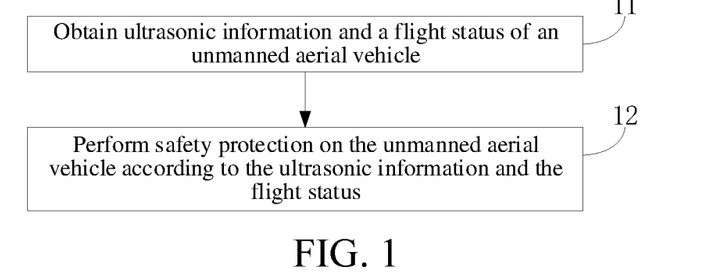
FIG. 1 is a flowchart of an unmanned aerial vehicle safety protection method according to an embodiment of the present invention.

FIG. 1 is a flowchart of an unmanned aerial vehicle safety protection method according to an embodiment of the present invention. The method is applied to an unmanned aerial vehicle, and is specifically performed by a flight controller of the unmanned aerial vehicle. The method includes the following steps.

Step 11: Obtain ultrasonic information and a flight status of the unmanned aerial vehicle.

The ultrasonic information is information detected by an ultrasonic radar of the unmanned aerial vehicle, and specifically includes an ultrasonically measured height, a time stamp sequence that ultrasonic returns to the flight controller and the like. The ultrasonically measured height is a height of the unmanned aerial vehicle from the ground detected by ultrasound. The time stamp sequence that ultrasonic returns to the flight controller is a time node sequence corresponding to the ultrasound data. Each piece of ultrasound data corresponds to a time node, and is used for indicating when the ultrasonically measured height is measured. For example, time stamps include the $0.1^{th}$ second, the $0.2^{th}$ second and the $0.3^{th}$ second. Ultrasonically measured heights include: 0.5 meters, 0.6 meters and 0.9 meters. The unmanned aerial vehicle sends the ultrasonically measured height of 0.5 meters with the time stamp of the $0.1^{th}$ second to the flight controller, indicating that the ultrasonically measured height detected at the $0.1^{th}$ second is 0.5 meters. The unmanned aerial vehicle sends the ultrasonically measured height of 0.6 meters with the time stamp of the $0.2^{th}$ second, indicating that the ultrasonically measured height detected at the $0.2^{th}$ second is 0.6 meters. The unmanned aerial vehicle sends the ultrasonically measured height of 0.9 meters with the time stamp of the $0.3^{th}$ second, indicating that the ultrasonically measured height detected at the $0.3^{th}$ second is 0.9 meters. Therefore, the flight controller can obtain an ultrasonically measured height at a time.

The flight status includes a descending state, a normal flight state, a takeoff state and the like. The normal flight state may include an accelerated flight, a decelerated flight and the like.

Step 12: Perform safety protection on the unmanned aerial vehicle according to the ultrasonic information and the flight status.

In this embodiment, different safety protection methods are implemented for the unmanned aerial vehicle mainly based on the ultrasonic status including normal ultrasound and abnormal ultrasound of the unmanned aerial vehicle and the unmanned aerial vehicle being the normal flight state or the descending state, thereby improving the safety of the unmanned aerial vehicle and the flexibility of safety protection of the unmanned aerial vehicle.

The unmanned aerial vehicle safety protection method is described below in detail from the normal flight state and the descending state of the unmanned aerial vehicle.

Figure 2:
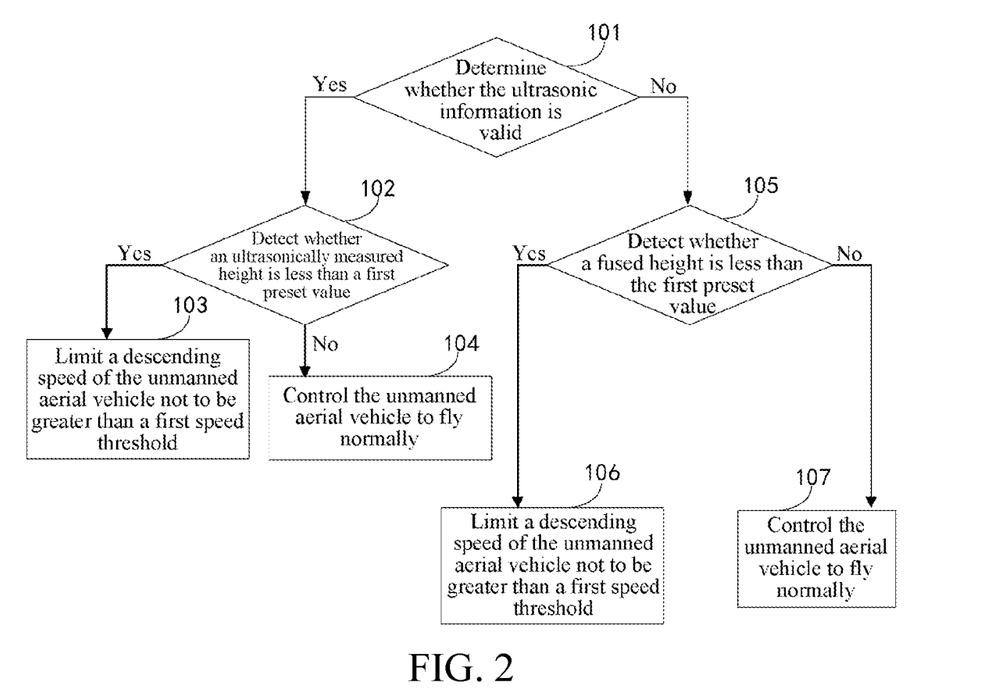
FIG. 2 is a flowchart of a method for performing safety protection on an unmanned aerial vehicle according to ultrasonic information and a flight status according to an embodiment of the present invention.

As shown in FIG. 2, when the flight status of the unmanned aerial vehicle is the normal flight state, the performing safety protection on the unmanned aerial vehicle according to the ultrasonic information and the flight status includes:

Step 101: Determine whether the ultrasonic information is valid.

Figure 3:
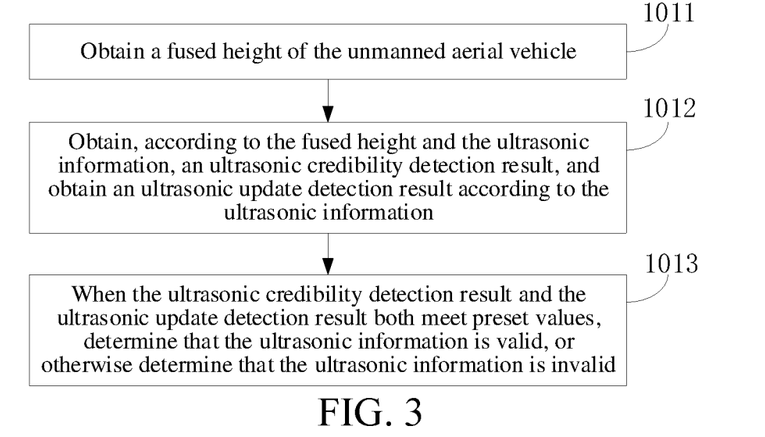
FIG. 3 is a flowchart of a method for determining whether ultrasonic information is valid in an unmanned aerial vehicle safety protection method according to an embodiment of the present invention.

The determining whether the ultrasonic information is valid is determining whether the ultrasound of the unmanned aerial vehicle is abnormal. Specifically, as shown in FIG. 3, the determining whether the ultrasonic information is valid includes the following steps.

Step 1011: Obtain a fused height of the unmanned aerial vehicle.

The fused height, also referred to as a flight height, is a height of the unmanned aerial vehicle from a takeoff point. The fused height is detected through various sensors. The sensor includes a barometric altimeter, an accelerometer, an ultrasonic sensor, a radar sensor and the like.

Step 1012: Obtain, according to the fused height and the ultrasonic information, an ultrasonic credibility detection result, and obtain an ultrasonic update detection result according to the ultrasonic information.

The ultrasonic credibility detection result is used for determining whether a value outputted by the ultrasound of the unmanned aerial vehicle is useable. In this embodiment, the ultrasonic credibility detection result may be represented by a digit signal. For example, when the ultrasonic credibility detection result is "1", it indicates that the value outputted by the ultrasound is usable. When the ultrasonic credibility detection result is "0", it indicates that the value outputted by the ultrasound is unusable.

The ultrasonic update detection result is used for recognizing whether the ultrasound data of the unmanned aerial vehicle is still updated normally. In this embodiment, the ultrasound data passes through an update detection module. The update detection module obtains the ultrasonic update detection result according to the ultrasound data. The ultrasonic update detection result may also be represented by a digit signal. For example, when the ultrasonic update detection result is "1", it indicates that the ultrasound data is updated normally. When the ultrasonic update detection result is "0", it indicates that the ultrasound data is updated abnormally.

In this embodiment, the obtaining, according to the fused height and the ultrasonic information, an ultrasonic credibility detection result includes: obtaining the ultrasonically measured height according to the ultrasonic information; calculating derivatives of the ultrasonically measured height and the fused height separately to output differential information of the ultrasonically measured height and differential information of the fused height; separately filtering the differential information of the ultrasonically measured height and the differential information of the fused height to obtain filtered differential information of the ultrasonically measured height and filtered differential information of the fused height; and obtaining the ultrasonic credibility detection result according to the differential information of the ultrasonically measured height and the differential information of the fused height.

When the unmanned aerial vehicle descends, the ultrasonically measured height detected by the ultrasound and the fused height may be not equal. However, ascending speeds and descending speeds of the unmanned aerial vehicle represented by respective sections of differentials should be relatively close. Therefore, the ascending speed and the descending speed of the unmanned aerial vehicle represented by one section of differential is used as a determining basis. The derivative of the ultrasonically measured height is calculated to output the differential information of the ultrasonically measured height. The derivative of the fused height is calculated to obtain the differential information of the fused height. The two pieces of differential information are compared to obtain a difference to determine whether the value outputted by the ultrasound is usable.

A filter may be specifically a differential filter. Because a signal in engineering usually contains noise, the noise is filtered out by the filter to obtain approximate derivatives of the ultrasonically measured height and the fused height more accurately.

The obtaining the ultrasonic credibility detection result according to the differential information of the ultrasonically measured height and the differential information of the fused height specifically includes: performing difference comparison on the differential information of the ultrasonically measured height and the differential information of the fused height. When a result of the difference comparison is in a preset range, the outputted ultrasonic credibility detection result is credible. When the result of the difference comparison is not in the preset range, the outputted ultrasonic credibility detection result is incredible.

The differential information of the ultrasonically measured height and the differential information of the fused height may be the same or different. When the two differentials are the same or the difference between the two differentials is in the preset range, the ultrasonic credibility detection result is credible, that is, it indicates that the value outputted by the ultrasound is usable, or otherwise the ultrasonic credibility detection result is incredible, and the value outputted by the ultrasound is unusable. The preset range may be manually customized or set by a system.

In this embodiment, the obtaining an ultrasonic update detection result according to the ultrasonic information includes: performing time stamp update detection, ultrasonic value change detection and ultrasonic value abnormality detection according to the ultrasonic information to obtain results of the time stamp update detection, the ultrasonic value change detection and the ultrasonic value abnormality detection; and performing logical operations on the results of the time stamp update detection, the ultrasonic value change detection and the ultrasonic value abnormality detection to obtain the ultrasonic update detection result.

The result of the time stamp update detection is obtained according to the time stamp update detection. The time stamp update detection is specifically to detect a time difference between a current step and a previous step. If a difference between the time difference and a preset time step value is in the preset range, the result of the time stamp update detection is outputted as 1, indicating that the time stamp is updated normally. If the difference between the time difference and the preset time step value is zero or is not in the preset range, the result of the time stamp update detection is outputted as 0, indicating that the time stamp is updated abnormally.

The result of the ultrasonic value change detection is obtained according to the ultrasonic value change detection. The ultrasonic value change detection is specifically to take an ultrasonically measured height corresponding to a current moment and ultrasonically measured heights corresponding to moments of a preset quantity (such as 3 or 5) before the current moment. If any three of the ultrasonically measured heights are not equal, the result of the ultrasonic value change detection is outputted as 1, indicating that the change of the ultrasonic value is normal, or otherwise the result of the ultrasonic value change detection is outputted as 0, indicating that the change of the ultrasonic value is abnormal. It should be noted that, the quantity of unequal ultrasonically measured heights can be any quantity other than 3. This is not limited herein.

The result of the ultrasonic value abnormality detection is obtained according to the ultrasonic value abnormality detection. The ultrasonic value abnormality detection is specifically to detect a difference between an ultrasound value of a current step and an ultrasound value of a previous step and a difference between the ultrasound value of the previous step and an ultrasound value of a previous step of the previous step. If differences between ultrasound values of five consecutive steps are 0, the result of the ultrasonic value abnormality detection is outputted as 0, indicating that the ultrasound is abnormal, or otherwise the result of the ultrasonic value abnormality detection is outputted as 1, indicating that the ultrasound is normal. It should be noted that, the quantity of steps of the ultrasonic value is not limited to 5 and may be any quantity between 3 and 10.

The performing logical operations on the results of the time stamp update detection, the ultrasonic value change detection and the ultrasonic value abnormality detection is specifically to perform a logical AND operation on the results of the time stamp update detection, the ultrasonic value change detection and the ultrasonic value abnormality detection. When the results of the time stamp update detection, the ultrasonic value change detection and the ultrasonic value abnormality detection are all outputted as 1, that is, the three results are all normal, the ultrasonic update detection result is normal, and it is outputted that ultrasound is normal to updates a flag bit to 1, or otherwise, the ultrasonic update detection result is abnormal, and it is outputted that ultrasound is abnormal to update the flag bit to 0. It should be noted that, in addition to the logical AND, the foregoing logical operation may be another logical operation such as logical OR. In this embodiment, preferably, the logical operation is a logical AND operation.

Step 1013: When the ultrasonic credibility detection result and the ultrasonic update detection result both meet preset values, determine that the ultrasonic information is valid, or otherwise determine that the ultrasonic information is invalid.

When the ultrasonic credibility detection result is credible and the ultrasonic update detection result indicates that the ultrasound is updated normally, it is determined that the ultrasonic information is valid, or otherwise, it is determined that the ultrasonic information is invalid.

In this embodiment, the ultrasonic credibility detection result and the ultrasonic update detection result are both represented by digit signals 0 and 1. That is, 1 represents that the ultrasonic credibility detection result is credible and the ultrasound is updated normally. 0 represents that the ultrasonic credibility detection result is incredible and the ultrasound is updated abnormally. In this case, the logic AND operation may be performed on the ultrasonic update detection result and the ultrasonic credibility detection result. When a result of the logic AND operation is outputted as 1, the ultrasonic information is valid. When the result of the logic AND operation is outputted as 0, the ultrasonic information is invalid.

It may be determined, according to the foregoing step 1011 to step 1013, whether the ultrasonic information is valid.

If the ultrasonic information is valid, the following step 102 is performed.

Step 102: Detect whether an ultrasonically measured height is less than a first preset value.

The ultrasonically measured height may be obtained according to the ultrasonic information. The first preset value may be any value between 2 and 6. For example, the first preset value is 5.

If the ultrasonically measured height is less than the first preset value, the following step 103 is performed.

Step 103: Limit a descending speed of the unmanned aerial vehicle not to be greater than a first speed threshold.

The first speed threshold may be specifically 2 m/s. The first speed threshold may be alternatively any value between 1 m/s and 3 m/s.

If the ultrasonically measured height is greater than or equal to the first preset value, the following step 104 is performed.

Step 104: Control the unmanned aerial vehicle to fly normally.

In the foregoing, the unmanned aerial vehicle is in the normal flight state, and the ultrasonic information is valid. If the ultrasonic information is invalid, that is, the ultrasound is abnormal, the following step 105 is performed.

Step 105: Detect whether a fused height is less than the first preset value.

The fused height, also referred to as a flight height, is a height of the unmanned aerial vehicle from a takeoff point. The fused height is detected through various sensors. The sensor includes a barometric altimeter, an accelerometer, an ultrasonic sensor, a radar sensor and the like. The first preset value may be any value between 2 meters and 6 meters. For example, the first preset value is 5 meters.

If the fused height is less than the first preset value, the following step 106 is performed.

Step 106: Limit a descending speed of the unmanned aerial vehicle not to be greater than the first speed threshold.

The first speed threshold may be specifically 2 m/s. The first speed threshold may be alternatively any value between 1 m/s and 3 m/s.

If the fused height is greater than or equal to the first preset value, the following step 107 is performed.

Step 107: Control the unmanned aerial vehicle to fly normally.

The embodiment of the present invention is a specific process of performing safety protection on the unmanned aerial vehicle according to the ultrasonic information and the normal flight state when the unmanned aerial vehicle is the normal flight state. The implementation can perform corresponding processing in time according to an ultrasonic status of the unmanned aerial vehicle, thereby ensuring the normal flight of the unmanned aerial vehicle, avoiding accidents such as high-altitude crashing, and improving the stability and safety of the unmanned aerial vehicle during normal flight.

Figure 4:
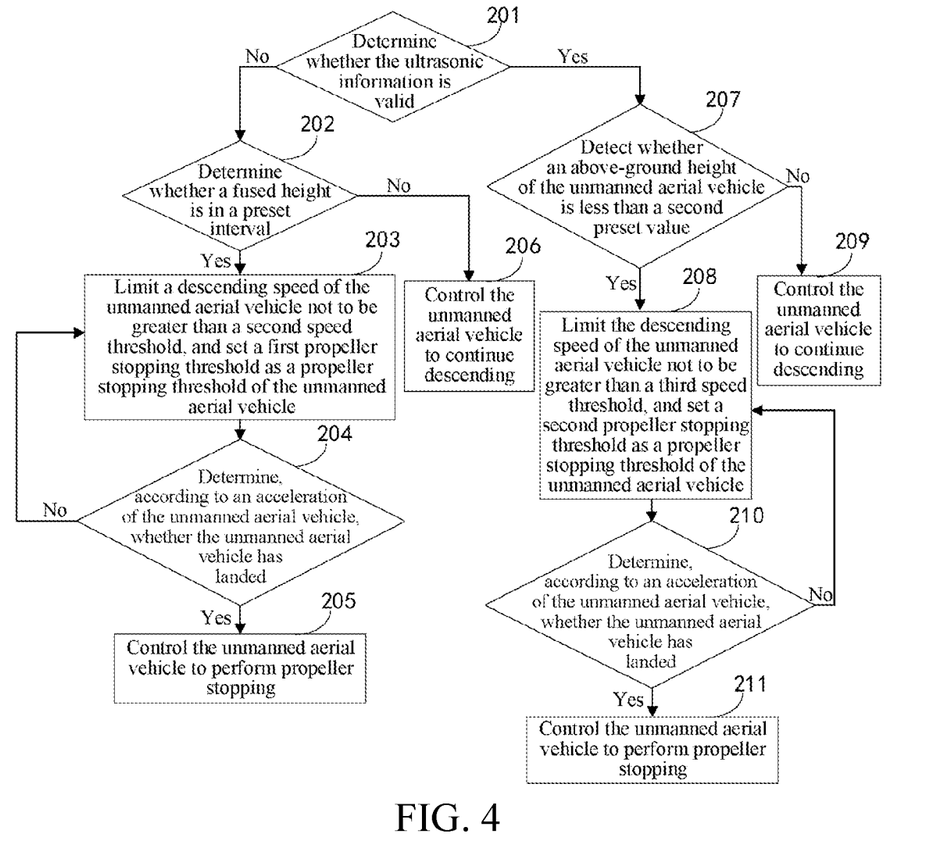
FIG. 4 is a flowchart of a method for performing safety protection on an unmanned aerial vehicle according to ultrasonic information and a flight status according to another embodiment of the present invention.

As shown in FIG. 4, when the flight status of the unmanned aerial vehicle is the descending state, the performing safety protection on the unmanned aerial vehicle according to the ultrasonic information and the flight status includes:

Step 201: Determine whether the ultrasonic information is valid.

For the detailed process of determining whether the ultrasonic information is valid, refer to step 1011 to step 1013 in the foregoing embodiments.

If the ultrasonic information is invalid, the following step 202 is performed.

Step 202: Determine whether a fused height is in a preset interval.

The fused height, also referred to as a flight height, is a height of the unmanned aerial vehicle from a takeoff point. The fused height is detected through various sensors. The sensor includes a barometric altimeter, an accelerometer, an ultrasonic sensor, a radar sensor and the like.

The preset interval may be specifically −2 meters to 2 meters. That is, it is determined whether the fused height is greater than or equal to −2 meters and less than or equal to 2 meters. The preset interval may be customized by a user according to a personal habit, or may be defined by a system. A specific value of the preset value may be set according to an actual application scenario.

If the fused height is in the preset interval, the following step 203 is performed.

Step 203: Limit a descending speed of the unmanned aerial vehicle not to be greater than a second speed threshold, and set a first propeller stopping threshold as a propeller stopping threshold of the unmanned aerial vehicle.

The second speed threshold may be any value between 0.5 m/s and 1.5 m/s. For example, the second speed threshold is 1 m/s. The first propeller stopping threshold is specifically an acceleration determining threshold when the unmanned aerial vehicle has landed. The first propeller stopping threshold corresponding to the second speed threshold may be specifically 7.5 or may be any value between 5 and 9.

In some embodiments, referring to FIG. 4 again, after step 203 is performed, the method further includes:

Step 204: Determine, according to an acceleration of the unmanned aerial vehicle, whether the unmanned aerial vehicle has landed.

The determining whether the unmanned aerial vehicle has landed includes: obtaining a Z-axis acceleration $A_z$ and a specific thrust T of the unmanned aerial vehicle; calculating a value of A according to a formula $A=-A_z-T$; and determining whether the value of A is greater than the first propeller stopping threshold, where if the value of A is greater than the first propeller stopping threshold, the unmanned aerial vehicle has landed, or if the value of A is not greater than the first propeller stopping threshold, the unmanned aerial vehicle has not landed.

The Z-axis acceleration $A_z$ is vertically downward, and is specifically an acceleration of an inertial measuring unit of the unmanned aerial vehicle. The specific thrust T is specifically a ratio of a pulling force of a motor to the weight of the unmanned aerial vehicle. The value of A is compared with the first propeller stopping threshold. For example, A is compared with 7.5. When A>7.5, the unmanned aerial vehicle has landed. In this case, propeller stopping is started, or otherwise the unmanned aerial vehicle has not landed. In this case, the process may jump to perform a step of obtaining a Z-axis acceleration $A_z$ and a specific thrust T of the unmanned aerial vehicle to continue to determine whether the unmanned aerial vehicle has landed. In addition, the descending speed of the unmanned aerial vehicle is controlled to be the second speed threshold, and the first propeller stopping threshold corresponding to the second speed threshold is set.

It should be noted that, in addition to the foregoing method for determining whether the unmanned aerial vehicle has landed, other methods may be adopted.

If the unmanned aerial vehicle has landed, the following step 205 is performed.

Step 205: Control the unmanned aerial vehicle to perform propeller stopping.

If the unmanned aerial vehicle has not landed, the process jumps to perform step 203.

In some embodiments, if the fused height is not in the preset interval, the following step 206 is performed.

Step 206: Control the unmanned aerial vehicle to continue descending.

In some embodiments, If the ultrasonic information is valid, the following step 207 is performed.

Step 207: Detect whether an above-ground height of the unmanned aerial vehicle is less than a second preset value.

As the unmanned aerial vehicle descends, the unmanned aerial vehicle is usually prone to an ultrasonic abnormality when a distance of the unmanned aerial vehicle from the ground is 0.5 meters. Therefore, the second preset value is preferably 0.5 meters. Certainly, in an actual application, the second preset value may be any value between 0.3 meters and 0.8 meters.

If the above-ground height is less than the second preset value, the following step 208 is performed.

Step 208: Limit the descending speed of the unmanned aerial vehicle not to be greater than a third speed threshold, and set a second propeller stopping threshold as a propeller stopping threshold of the unmanned aerial vehicle.

The third speed threshold may be specifically 0.2 m/s. The third speed threshold may be any value between 0.1 m/s and 0.4 m/s. The second propeller stopping threshold is specifically an acceleration determining threshold when the unmanned aerial vehicle has landed. The second propeller stopping threshold corresponding to the third speed threshold may be specifically 2.8 or may be any value between 2 and 4.

If the above-ground height is greater than or equal to the second preset value, the following step 209 is performed.

Step 209: Control the unmanned aerial vehicle to continue descending.

In some embodiments, referring to FIG. 4 again, after step 208 is performed, the method further includes the following steps.

Step 210: Determine, according to an acceleration of the unmanned aerial vehicle, whether the unmanned aerial vehicle has landed.

The determining whether the unmanned aerial vehicle has landed includes: obtaining a Z-axis acceleration $A_z$ and a specific thrust T of the unmanned aerial vehicle; calculating a value of A according to a formula $A=-A_z-T$; and determining whether the value of A is greater than the second propeller stopping threshold, where if the value of A is greater than the second propeller stopping threshold, the unmanned aerial vehicle has landed, or if the value of A is not greater than the second propeller stopping threshold, the unmanned aerial vehicle has not landed.

The Z-axis acceleration $A_z$ is vertically downward, and is specifically an acceleration of an inertial measuring unit of the unmanned aerial vehicle. The specific thrust T is specifically a ratio of a pulling force of a motor to the weight of the unmanned aerial vehicle. The value of A is compared with the second propeller stopping threshold. For example, A is compared with 2.8. When $A>2.8$, the unmanned aerial vehicle has landed. In this case, propeller stopping is started, or otherwise the unmanned aerial vehicle has not landed. In this case, the process may jump to perform a step of obtaining a Z-axis acceleration $A_z$ and a specific thrust T of the unmanned aerial vehicle to continue to determine whether the unmanned aerial vehicle has landed. In addition, the descending speed of the unmanned aerial vehicle is controlled to be the third speed threshold, and the second propeller stopping threshold corresponding to the third speed threshold is set.

It should be noted that, in addition to the foregoing method for determining whether the unmanned aerial vehicle has landed, or other methods may be adopted.

If the unmanned aerial vehicle has landed, the following step 211 is performed.

Step 211: Control the unmanned aerial vehicle to perform propeller stopping.

If the unmanned aerial vehicle has not landed, the process jumps to perform step 208.

The embodiment of the present invention is a specific process of performing safety protection on the unmanned aerial vehicle according to the ultrasonic information and the descending state when the unmanned aerial vehicle is in the descending state. The implementation can perform corresponding processing in time according to an ultrasonic status of the unmanned aerial vehicle. The implementation adjusts a descending speed of the unmanned aerial vehicle respectively through the fused height and the above-ground height of the unmanned aerial vehicle, and correspondingly protects the landing of the unmanned aerial vehicle. This embodiment can avoid a phenomenon that the unmanned aerial vehicle has landed without slowing down to violently hit the ground, thereby improving the safety of the unmanned aerial vehicle during landing.

The embodiments of the present invention provide an unmanned aerial vehicle safety protection method. In the method, ultrasonic information and a flight status of an unmanned aerial vehicle are obtained to perform safety protection on the unmanned aerial vehicle according to the ultrasonic information and the flight status. The ultrasonic information may be data information acquired through normal ultrasound or may be data information acquired by abnormal ultrasound. The ultrasonic information includes an ultrasonically measured height. The flight status includes a landing state and a normal flight state. When the safety protection is performed on the unmanned aerial vehicle according to the ultrasonic information and the flight status, different safety protection methods are adopted specifically according to abnormalities of the ultrasound information and the current flight status. The implementation improves the flexibility of safety protection of the unmanned aerial vehicle, and reduces an occurrence probability that the unmanned aerial vehicle crashes at a high altitude when ultrasound encounters abnormalities to get out of control at the high altitude and fail to descend, rise, move to the left or move to the right and land without slowing down to violently hit the ground, so that the safety of the unmanned aerial vehicle is enhanced, and user experience is improved.

Figure 5:
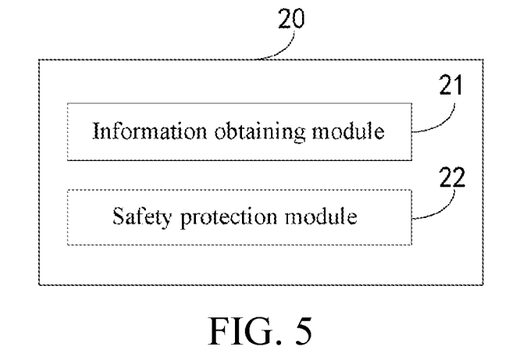
FIG. 5 is a schematic structural diagram of an unmanned aerial vehicle safety protection apparatus according to an embodiment of the present invention.

FIG. 5 is a schematic structural diagram of an unmanned aerial vehicle safety protection apparatus according to an embodiment of the present invention. The apparatus is applied to an unmanned aerial vehicle. The apparatus 20 includes an information obtaining module 21 and a safety protection module 22. In an embodiment of the present invention, the information obtaining module 21 and the safety protection module 22 may be a flight controller in the unmanned aerial vehicle.

The information obtaining module 21 is configured to obtain ultrasonic information and a flight status of the unmanned aerial vehicle. The safety protection module 22 is configured to perform safety protection on the unmanned aerial vehicle according to the ultrasonic information and the flight status.

In this embodiment, the flight status includes a normal flight state and a descending state. The safety protection of the unmanned aerial vehicle is described below in detail according to the normal flight state and the descending state and the ultrasonic information.

When the flight status is the normal flight state, the safety protection module 22 is further configured to determine whether the ultrasonic information is valid. If the ultrasonic information is valid, the safety protection module 22 is configured to:

detect whether an ultrasonically measured height is less than a first preset value; and if the ultrasonically measured height is less than the first preset value, limit a descending speed of the unmanned aerial vehicle not to be greater than a first speed threshold.

When the ultrasonically measured height is greater than or equal to the first preset value, the safety protection module 22 is configured to control the unmanned aerial vehicle to fly normally.

In some embodiments, when the flight status is the normal flight state, if the ultrasonic information is invalid, the safety protection module 22 is further configured to:

detect whether a fused height is less than the first preset value.

If the fused height is less than the first preset value, the safety protection module 22 is further configured to limit a descending speed of the unmanned aerial vehicle not to be greater than the first speed threshold.

When the fused height is greater than or equal to the first preset value, the safety protection module 22 is further configured to control the unmanned aerial vehicle to fly normally.

When the flight status is the descending state, the safety protection module 22 is further configured to determine whether the ultrasonic information is valid; if the ultrasonic information is invalid, determine whether the fused height is in a preset interval. If the fused height is in the preset interval, the safety protection module 22 is configured to:

limit a descending speed of the unmanned aerial vehicle not to be greater than a second speed threshold, and set a first propeller stopping threshold as a propeller stopping threshold of the unmanned aerial vehicle.

If the fused height is not in the preset interval, the safety protection module 22 is configured to control the unmanned aerial vehicle to continue descending.

In some embodiments, when the flight status is the descending state, the safety protection module 22 is further configured to: determine, according to an acceleration of the unmanned aerial vehicle, whether the unmanned aerial vehicle has landed, control the unmanned aerial vehicle to perform propeller stopping; and if the unmanned aerial vehicle has not landed, limit the descending speed of the unmanned aerial vehicle not to be greater than the second speed threshold, and set the first propeller stopping threshold as the propeller stopping threshold of the unmanned aerial vehicle.

The determining whether the unmanned aerial vehicle has landed includes: obtaining a Z-axis acceleration Az and a specific thrust T of the unmanned aerial vehicle; calculating a value of A according to a formula $A=-Az-T$; determining whether the value of A is greater than the first propeller stopping threshold, where if the value of A is greater than the first propeller stopping threshold, the unmanned aerial vehicle has landed, or if the value of A is not greater than the first propeller stopping threshold, the unmanned aerial vehicle has not landed.

In some embodiments, when the flight status is the descending state, the safety protection module 22 is further configured to:

when the ultrasonic information is valid, detect whether an above-ground height of the unmanned aerial vehicle is less than a second preset value; if the above-ground height of the unmanned aerial vehicle is less than the second preset value, limit the descending speed of the unmanned aerial vehicle not to be greater than a third speed threshold, and set a second propeller stopping threshold as the propeller stopping threshold of the unmanned aerial vehicle; and when it is detected that the above-ground height of the unmanned aerial vehicle is greater than or equal to the second preset value, control the unmanned aerial vehicle to continue descending.

In some embodiments, when the flight status is the descending state, the safety protection module 22 is further configured to:

determine, according to an acceleration of the unmanned aerial vehicle, whether the unmanned aerial vehicle has landed; if the unmanned aerial vehicle has landed, control the unmanned aerial vehicle to perform propeller stopping; and if the unmanned aerial vehicle has not landed, limit the descending speed of the unmanned aerial vehicle not to be greater than a third speed threshold, and set a second propeller stopping threshold as the propeller stopping threshold of the unmanned aerial vehicle.

The determining whether the unmanned aerial vehicle has landed includes: obtaining a Z-axis acceleration Az and a specific thrust T of the unmanned aerial vehicle; calculating a value of A according to a formula $A=-Az-T$; and determining whether the value of A is greater than the second propeller stopping threshold, where if the value of A is greater than the second propeller stopping threshold, the unmanned aerial vehicle has landed, or if the value of A is not greater than the second propeller stopping threshold, the unmanned aerial vehicle has not landed.

The determining whether the ultrasonic information is valid includes: obtaining a fused height of the unmanned aerial vehicle; obtaining, according to the fused height and the ultrasonic information, an ultrasonic credibility detection result, and obtaining an ultrasonic update detection result according to the ultrasonic information; and when the ultrasonic credibility detection result and the ultrasonic update detection result both meet preset values, determining that the ultrasonic information is valid, or otherwise determining that the ultrasonic information is invalid.

It should be noted that content such as information exchange and an execution process between the modules and units in the apparatus is based on the same concept as the method embodiments of the present invention. Therefore, for details, refer to descriptions in the method embodiments of the present invention, and details are not described herein again.

The embodiments of the present invention provide an unmanned aerial vehicle safety protection apparatus. The apparatus obtains ultrasonic information and a flight status of an unmanned aerial vehicle to perform safety protection on the unmanned aerial vehicle according to the ultrasonic information and the flight status. The ultrasonic information may be data information acquired through normal ultrasound or may be data information acquired by abnormal ultrasound. The ultrasonic information includes an ultrasonically measured height. The flight status includes a landing state and a normal flight state. When the safety protection is performed on the unmanned aerial vehicle according to the ultrasonic information and the flight status, different safety protection methods are adopted specifically according to abnormalities of the ultrasound information and the current flight status. The implementation improves the flexibility of safety protection of the unmanned aerial vehicle, and reduces an occurrence probability that the unmanned aerial vehicle crashes at a high altitude when ultrasound encounters abnormalities to get out of control at the high altitude and fail to descend, rise, move to the left or move to the right and land without slowing down to violently hit the ground, so that the safety of the unmanned aerial vehicle is enhanced, and user experience is improved.

Figure 6:
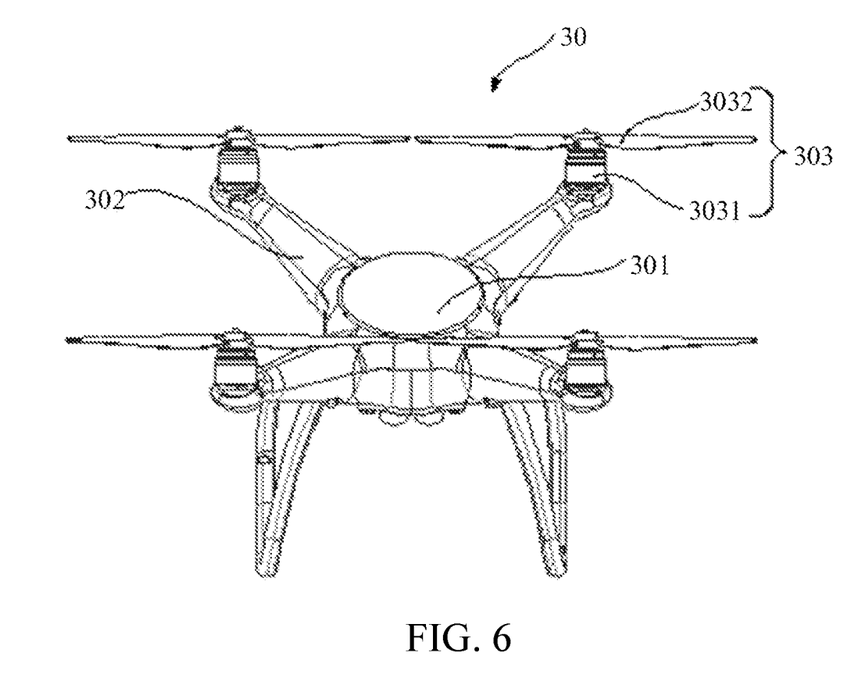
FIG. 6 is a schematic structural diagram of an unmanned aerial vehicle according to an embodiment of the present invention.
Figure 7:
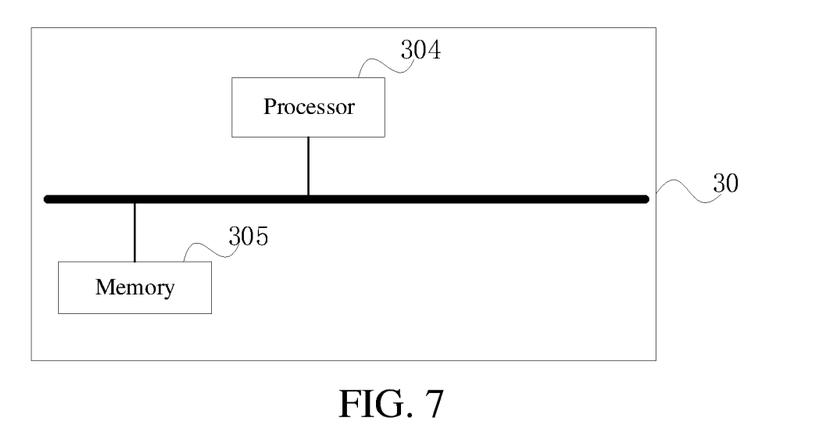
FIG. 7 is a schematic diagram of a hardware structure of an unmanned aerial vehicle according to an embodiment of the present invention.

FIG. 6 is a schematic structural diagram of an unmanned aerial vehicle according to an embodiment of the present invention. FIG. 7 is a schematic diagram of a hardware structure of an unmanned aerial vehicle according to an embodiment of the present invention. As shown in FIG. 6 and FIG. 7, the unmanned aerial vehicle 30 includes: a vehicle body 301, four vehicle arms 302 extending from the vehicle body 301, a power apparatus 303 mounted on each vehicle arm 302, and a flight controller arranged in the vehicle body 301. The flight controller includes at least one processor 304 and a memory 305 communicatively connected to the at least one processor 304.

The unmanned aerial vehicle 30 shown in FIG. 6 is a quadrotor unmanned aerial vehicle. There are four power apparatuses 303. In another possible embodiment, the unmanned aerial vehicle 30 may be any other type of unmanned aerial vehicle such as a fixed-wing unmanned aerial vehicle. When the power apparatus 303 is applied to another type of unmanned aerial vehicle, the quantity of the power apparatus 303 may be changed according to an actual requirement. This is not limited by the present invention.

In an embodiment of the present invention, the vehicle arms 302 is fixedly connected to the vehicle body 301. Preferably, the vehicle arms 302 and the vehicle body 301 are integrally formed. In another possible embodiment, the vehicle arms 302 may also be connected to the vehicle body 301 in an expanded or folded manner relative to the vehicle body 301. For example, the vehicle arms 302 may be connected to the vehicle body 301 by a rotating shaft mechanism. In this way, the vehicle arms 302 may be expanded or folded relative to the vehicle body 301.

In an embodiment of the present invention, the power apparatus 303 includes a driving apparatus 3031 and a propeller component 3032 driven by the driving apparatus 3031. The propeller component 3032 is mounted on an output shaft of the driving apparatus 3031. The propeller component 3032 is driven by the driving apparatus 3031 to rotate to generate a lift or thrust to make the unmanned aerial vehicle 30 fly. The driving apparatus 3031 may be any appropriate type of motor such as a brushed motor, a brushless motor, a direct current motor, a stepper motor and an alternating current induction motor.

In FIG. 7, the processor 304 is used as an example. The processor 304 and the memory 305 may be connected by a bus or in another manner. In FIG. 7, a bus connection is used as an example.

As a non-volatile computer-readable storage medium, the memory 305 may be configured to store non-volatile software programs, non-volatile computer-executable programs, and modules, such as program instructions/modules corresponding to the unmanned aerial vehicle safety protection method in the embodiments of the present invention. (for example, the information obtaining module 21 and the safety protection module 22 shown in FIG. 5). The processor 304 runs the non-volatile software programs and instructions and modules stored in the memory 305, to execute various functional applications and data processing of a server, that is, to implement the unmanned aerial vehicle safety protection method of the foregoing method embodiments.

The memory 305 may include a program storage area and a data storage area. The program storage area may store an operating system and an application program required by at least one function. The data storage area may store data created according to the use of the unmanned aerial vehicle safety protection apparatus and the like. In addition, the memory 305 may include a high-speed random access memory, and may also include a nonvolatile memory, for example, at least one magnetic disk storage device, a flash memory, or another volatile solid-status storage device. In some embodiments, the memory 305 optionally includes memories remotely disposed relative to the processor 304, and these remote memories may be connected to the unmanned aerial vehicle safety protection apparatus through a network. Instances of the network include, but are not limited to, the Internet, an intranet, a local area network, a mobile communication network, and a combination thereof.

The one or more modules are stored in the memory 305. When the one or more modules are executed by the one or more processors 304, the unmanned aerial vehicle safety protection method in any of the foregoing method embodiments is performed. For example, step 11 and step 12 of the method in FIG. 1, step 101 to step 107 of the method in FIG. 2, step 1011 to step 1013 of the method in FIG. 3 and step 201 to step 212 of the method in FIG. 4 described above are performed to implement the functions of the module 21 and the module 22 in FIG. 5.

The foregoing product may perform the method provided in the embodiments of the present invention, and have corresponding functional modules and beneficial effects for performing the method. For technical details that are not described in detail in the present embodiment, refer to the method provided in the embodiments of the present invention.

The unmanned aerial vehicle of the embodiments of the present invention exist in various forms, including but not limited to a quadrotor unmanned aerial vehicle and the like.

The embodiments of the present invention provide a non-volatile computer-readable storage medium. The non-volatile computer-readable storage medium stores computer-executable instructions. The computer-executable instructions are executed by an unmanned aerial vehicle to perform the unmanned aerial vehicle safety protection method in any of the foregoing method embodiments. For example, step 11 and step 12 of the method in FIG. 1, step 101 to step 107 of the method in FIG. 2, step 1011 to step 1013 of the method in FIG. 3 and step 201 to step 212 of the method in FIG. 4 described above are performed to implement the functions of the module 21 and the module 22 in FIG. 5.

The embodiments of the present invention provide a computer program product, including a computer program stored in a non-volatile computer-readable storage medium. The computer program includes program instructions. When the program instructions are executed by a computer, the computer is caused to perform the unmanned aerial vehicle safety protection method in any of the foregoing method embodiments. For example, step 11 and step 12 of the method in FIG. 1, step 101 to step 107 of the method in FIG. 2, step 1011 to step 1013 of the method in FIG. 3 and step 201 to step 212 of the method in FIG. 4 described above are performed to implement the functions of the module 21 and the module 22 in FIG. 5.

The apparatus embodiments described above are merely schematic. The units described as separate parts may be or may not be physically apart. The parts displayed as units may be or may not be physical units, in other words, may be located at a same place, or may be distributed onto a plurality of network units. Some or all modules thereof may be selected based on an actual requirement, to implement an objective of the solution in this embodiment.

Through the description of the foregoing implementations, a person of ordinary skill in the art may clearly understand that the implementations may be implemented by software in combination with a universal hardware platform, and may certainly be implemented by hardware. A person of ordinary skill in the art may understand that all or some of the processes of the methods in the embodiments may be implemented by a computer program instructing relevant hardware. The program may be stored in a computer-readable storage medium. When the program is executed, the procedures of the foregoing method embodiments are performed. The foregoing storage medium may include a magnetic disc, an optical disc, a read-only memory (ROM), a random access memory (RAM), or the like.

Finally, it is to be noted that the foregoing embodiments are merely used for describing the technical solutions of the invention, but are not intended to limit the invention. Under the concept of the present invention, the technical features in the foregoing embodiments or different embodiments may also be combined, and steps may be implemented in any order. There are many other changes of different aspects of the present invention as described above, which are not provided in the details for brevity. Although the present invention is described in detail with reference to the foregoing embodiments, it should be understood that a person of ordinary skill in the art may still make modifications to the technical solutions described in the foregoing embodiments or make equivalent replacements to some technical features thereof, and these modifications or replacements will not cause the essence of corresponding technical solutions to depart from the scope of the technical solutions in the embodiments of the invention.

What is claimed is:

1. An unmanned aerial vehicle safety protection method, the method comprising:
   obtaining ultrasonic information and a flight status of an unmanned aerial vehicle, wherein the flight status comprises a normal flight state and a descending state; the ultrasonic information is obtained by an ultrasonic sensor; and
   performing safety protection on the unmanned aerial vehicle according to the ultrasonic information and the flight status;
   wherein when the flight status is the descending state, the performing safety protection on the unmanned aerial vehicle according to the ultrasonic information and the flight status comprises:
   determining whether the ultrasonic information is valid;
   in response to the ultrasonic information is invalid, determining whether a fused height is in a preset interval; and
   in response to the fused height is in the preset interval, limiting a descending speed of the unmanned aerial vehicle not to be greater than a second speed threshold, and setting a first propeller stopping threshold as a propeller stopping threshold of the unmanned aerial vehicle;
   determining, according to an acceleration of the unmanned aerial vehicle, whether the unmanned aerial vehicle has landed;
   controlling the unmanned aerial vehicle to perform propeller stopping, if the unmanned aerial vehicle has landed; and
   in response to the unmanned aerial vehicle has not landed, limiting the descending speed of the unmanned aerial vehicle not to be greater than the second speed threshold, and setting the first propeller stopping threshold as the propeller stopping threshold of the unmanned aerial vehicle;
   wherein the determining whether the unmanned aerial vehicle has landed comprises:
   obtaining a Z-axis acceleration Az and a specific thrust T of the unmanned aerial vehicle;
   calculating a value of A according to a formula $A=-Az-T$; and
   determining whether the value of A is greater than the first propeller stopping threshold, wherein if the value of A is greater than the first propeller stopping threshold, the unmanned aerial vehicle has landed, or if the value of A is not greater than the first propeller stopping threshold, the unmanned aerial vehicle has not landed.

2. The method according to claim 1, wherein when the flight status is the normal flight state, the performing safety protection on the unmanned aerial vehicle according to the ultrasonic information and the flight status comprises:
   determining whether the ultrasonic information is valid;
   in response to the ultrasonic information is valid, detecting whether an ultrasonically measured height is less than a first preset value;
   in response to the ultrasonically measured height is less than the first preset value, limiting a descending speed of the unmanned aerial vehicle not to be greater than a first speed threshold.

3. The method according to claim 2, wherein when the flight status is the normal flight state, the performing safety protection on the unmanned aerial vehicle according to the ultrasonic information and the flight status comprises:
   when the ultrasonically measured height is greater than or equal to the first preset value, controlling the unmanned aerial vehicle to fly normally.

4. The method according to claim 2, wherein when the flight status is the normal flight state, the performing safety protection on the unmanned aerial vehicle according to the ultrasonic information and the flight status further comprises:
   in response to the ultrasonic information is invalid, detecting whether a fused height is less than the first preset value;
   in response to the fused height is less than the first preset value, limiting the descending speed of the unmanned aerial vehicle not to be greater than the first speed threshold.

5. The method according to claim 4, wherein when the flight status is the normal flight state, the performing safety protection on the unmanned aerial vehicle according to the ultrasonic information and the flight status further comprises:
   when the fused height is greater than or equal to the first preset value, controlling the unmanned aerial vehicle to fly normally.

6. The method according to claim 2, wherein the determining whether the ultrasonic information is valid comprises:
   obtaining a fused height of the unmanned aerial vehicle;
   obtaining, according to the fused height and the ultrasonic information, an ultrasonic credibility detection result, and obtaining an ultrasonic update detection result according to the ultrasonic information; and
   when the ultrasonic credibility detection result and the ultrasonic update detection result both meet preset values, determining that the ultrasonic information is valid, or otherwise determining that the ultrasonic information is invalid.

7. The method according to claim 1, wherein when the flight status is the descending state, the performing safety protection on the unmanned aerial vehicle according to the ultrasonic information and the flight status comprises:

in response to the fused height is not in the preset interval, controlling the unmanned aerial vehicle to continue descending.

8. The method according to claim 7, wherein when the flight status is the descending state, the performing safety protection on the unmanned aerial vehicle according to the ultrasonic information and the flight status further comprises:
determining, according to an acceleration of the unmanned aerial vehicle, whether the unmanned aerial vehicle has landed;
in response to the unmanned aerial vehicle has landed, controlling the unmanned aerial vehicle to perform propeller stopping; and
in response to the unmanned aerial vehicle has not landed, limiting the descending speed of the unmanned aerial vehicle not to be greater than a third speed threshold, and setting a second propeller stopping threshold as the propeller stopping threshold of the unmanned aerial vehicle.

9. The method according to claim 8, wherein the determining whether the unmanned aerial vehicle has landed comprises:
obtaining a Z-axis acceleration Az and a specific thrust T of the unmanned aerial vehicle;
calculating a value of A according to a formula $A=-Az-T$; and
determining whether the value of A is greater than the second propeller stopping threshold, wherein if the value of A is greater than the second propeller stopping threshold, the unmanned aerial vehicle has landed, or if the value of A is not greater than the second propeller stopping threshold, the unmanned aerial vehicle has not landed.

10. The method according to claim 1, wherein when the flight status is the descending state, the performing safety protection on the unmanned aerial vehicle according to the ultrasonic information and the flight status further comprises:
when the ultrasonic information is valid, detecting whether an above-ground height of the unmanned aerial vehicle is less than a second preset value; and
in response to the above-ground height of the unmanned aerial vehicle is less than the second preset value, limiting the descending speed of the unmanned aerial vehicle not to be greater than a third speed threshold, and setting a second propeller stopping threshold as the propeller stopping threshold of the unmanned aerial vehicle.

11. The method according to claim 10, wherein when the flight status is the descending state, the performing safety protection on the unmanned aerial vehicle according to the ultrasonic information and the flight status further comprises:
when it is detected that the above-ground height of the unmanned aerial vehicle is greater than or equal to the second preset value, controlling the unmanned aerial vehicle to continue descending.

12. An unmanned aerial vehicle, comprising:
a vehicle body;
a vehicle arm, connected to the vehicle body;
a power apparatus, arranged on the vehicle arm, and configured to supply power for the unmanned aerial vehicle to fly; and
a flight controller, arranged on the vehicle body, wherein the flight controller comprises:
at least one processor; and
a memory, communicatively connected to the at least one processor, the memory storing instructions executed by the at least one processor, the instructions being executed by the at least one processor to cause the at least one processor to perform:
obtaining ultrasonic information and a flight status of an unmanned aerial vehicle, wherein the flight status comprises a normal flight state and a descending state, the ultrasonic information is obtained by an ultrasonic sensor; and
performing safety protection on the unmanned aerial vehicle according to the ultrasonic information and the flight status;
wherein when the flight status is the descending state, the performing safety protection on the unmanned aerial vehicle according to the ultrasonic information and the flight status comprises:
determining whether the ultrasonic information is valid;
in response to the ultrasonic information is invalid, determining whether a fused height is in a preset interval; and
in response to the fused height is in the preset interval, limiting a descending speed of the unmanned aerial vehicle not to be greater than a second speed threshold, and setting a first propeller stopping threshold as a propeller stopping threshold of the unmanned aerial vehicle;
determining, according to an acceleration of the unmanned aerial vehicle, whether the unmanned aerial vehicle has landed;
controlling the unmanned aerial vehicle to perform propeller stopping, if the unmanned aerial vehicle has landed; and
in response to the unmanned aerial vehicle has not landed, limiting the descending speed of the unmanned aerial vehicle not to be greater than the second speed threshold, and setting the first propeller stopping threshold as the propeller stopping threshold of the unmanned aerial vehicle;
wherein the determining whether the unmanned aerial vehicle has landed comprises:
obtaining a Z-axis acceleration Az and a specific thrust T of the unmanned aerial vehicle;
calculating a value of A according to a formula $A=-Az-T$; and
determining whether the value of A is greater than the first propeller stopping threshold, wherein if the value of A is greater than the first propeller stopping threshold, the unmanned aerial vehicle has landed, or if the value of A is not greater than the first propeller stopping threshold, the unmanned aerial vehicle has not landed.

13. A non transitory computer-readable storage medium, storing computer-executable instructions, the computer-executable instructions being used for causing a computer to perform:
obtaining ultrasonic information and a flight status of an unmanned aerial vehicle, wherein the flight status comprises a normal flight state and a descending state, the ultrasonic information is obtained by an ultrasonic sensor; and
performing safety protection on the unmanned aerial vehicle according to the ultrasonic information and the flight status;
wherein when the flight status is the descending state, the performing safety protection on the unmanned aerial vehicle according to the ultrasonic information and the flight status comprises:

determining whether the ultrasonic information is valid;
in response to the ultrasonic information is invalid, determining whether a fused height is in a preset interval; and
in response to the fused height is in the preset interval, limiting a descending speed of the unmanned aerial vehicle not to be greater than a second speed threshold, and setting a first propeller stopping threshold as a propeller stopping threshold of the unmanned aerial vehicle;
determining, according to an acceleration of the unmanned aerial vehicle, whether the unmanned aerial vehicle has landed;
controlling the unmanned aerial vehicle to perform propeller stopping, if the unmanned aerial vehicle has landed; and
in response to the unmanned aerial vehicle has not landed, limiting the descending speed of the unmanned aerial vehicle not to be greater than the second speed threshold, and setting the first propeller stopping threshold as the propeller stopping threshold of the unmanned aerial vehicle;
wherein the determining whether the unmanned aerial vehicle has landed comprises:
obtaining a Z-axis acceleration $Az$ and a specific thrust $T$ of the unmanned aerial vehicle;
calculating a value of $A$ according to a formula $A=-Az-T$, and
determining whether the value of $A$ is greater than the first propeller stopping threshold, wherein if the value of $A$ is greater than the first propeller stopping threshold, the unmanned aerial vehicle has landed, or if the value of $A$ is not greater than the first propeller stopping threshold, the unmanned aerial vehicle has not landed.

* * * * *